US012803915B2

(12) United States Patent
Elul et al.

(10) Patent No.: US 12,803,915 B2
(45) Date of Patent: Nov. 17, 2026

(54) LOAD BALANCING VPN TRAFFIC

(71) Applicant: HEWLETT PACKARD ENTERPRISE DEVELOPMENT LP, Spring, TX (US)

(72) Inventors: Natan Elul, Tel Aviv (IL); Roy Azachi, Tel Aviv (IL); Gil Azrielant, Tel Aviv (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 206 days.

(21) Appl. No.: 18/773,763

(22) Filed: Jul. 16, 2024

(65) Prior Publication Data

US 2025/0047606 A1 Feb. 6, 2025

Related U.S. Application Data

(60) Provisional application No. 63/516,664, filed on Jul. 31, 2023.

(51) Int. Cl.
*H04L 47/125* (2022.01)
*H04L 9/40* (2022.01)
(Continued)

(52) U.S. Cl.
CPC ........ *H04L 47/125* (2013.01); *H04L 63/0272* (2013.01); *H04L 67/1004* (2013.01); *H04L 69/164* (2013.01); *H04L 69/22* (2013.01)

(58) Field of Classification Search
CPC ............... H04L 47/125; H04L 63/0272; H04L 67/1004; H04L 69/164; H04L 69/22;
(Continued)

(56) References Cited

U.S. PATENT DOCUMENTS 9,106,482 B1 8/2015 Bapat et al.
11,528,320 B1 12/2022 Paralikar
(Continued)

FOREIGN PATENT DOCUMENTS

WO 2024/081014 A1 4/2024

OTHER PUBLICATIONS

Donenfeld, NDSS, WireGuard: Next Generation Kernel Network Tunnel, 2017 (12 pages).
(Continued)

*Primary Examiner* — Benjamin M Thieu
(74) *Attorney, Agent, or Firm* — Trop, Pruner & Hu, P.C.

(57) ABSTRACT

In some examples, a load balancer establishes respective secure connections between the load balancer and a plurality of destination servers in a trust network, and performs load balancing of encrypted virtual private network (VPN) traffic across the destination servers. The load balancer receives an encrypted data packet from a client device, the encrypted data packet including a VPN message header having a destination identification field relating to identifying a destination server in the trust network. The load balancer determines whether a selected destination server in the trust network is identified based on a value of the destination identification field in the VPN message header, the selected destination server being one of the plurality of destination servers. Based on determining that the selected destination server is identified based on the value of the destination identification field in the VPN header, the load balancer sends the encrypted data packet to the selected destination server.

19 Claims, 3 Drawing Sheets

(51) Int. Cl.
*H04L 67/1004* (2022.01)
*H04L 69/164* (2022.01)
*H04L 69/22* (2022.01)

(58) Field of Classification Search
CPC ............. H04L 67/1001; H04L 12/4641; H04L 63/0428; H04L 67/141; H04L 67/146
See application file for complete search history.

(56) References Cited

U.S. PATENT DOCUMENTS

| | | | | |
|---|---|---|---|---|
| 2002/0174034 | A1 | 11/2002 | Au et al. | |
| 2017/0163724 | A1 | 6/2017 | Puri et al. | |
| 2019/0372936 | A1* | 12/2019 | Sullenberger | H04L 63/164 |
| 2020/0412825 | A1 | 12/2020 | Siefker et al. | |
| 2021/0392079 | A1 | 12/2021 | Slovetskiy | |
| 2022/0166647 | A1* | 5/2022 | Norbutas | H04L 12/4633 |
| 2022/0345491 | A1 | 10/2022 | Luo et al. | |
| 2022/0385637 | A1* | 12/2022 | Thangapandi | H04L 63/164 |
| 2022/0394016 | A1* | 12/2022 | Solanki | H04L 12/4641 |
| 2023/0076070 | A1* | 3/2023 | Gupta | H04L 63/0272 |
| 2023/0118718 | A1* | 4/2023 | Solanki | H04L 12/4633 726/12 |
| 2023/0208923 | A1 | 6/2023 | Woodworth et al. | |
| 2023/0344921 | A1* | 10/2023 | Duraisamy | H04L 63/0272 |
| 2023/0421471 | A1 | 12/2023 | Beredimas et al. | |
| 2024/0129310 | A1 | 4/2024 | Andrews et al. | |
| 2025/0047605 | A1 | 2/2025 | Elul et al. | |

OTHER PUBLICATIONS

Elul et al., U.S. Appl. No. 18/773,755 entitled Load Balancing Client Connections Across Servers of a Trust Network filed Jul. 16, 2024 (33 pages).

Kubernetes, Nodes dated on or before Jul. 9, 2023 (10 pages).

Michael Kerrisk, namespaces(7)—Linux manual page, Dec. 2023 (7 pages).

Russell et al., iptables(8)—Linux man page downloaded Jun. 6, 2024 (34 pages).

Scholz et al., Performance Implications of Packet Filtering with Linux eBPF, 2018 (9 pages).

StrongSwan Documentation, Route-based VPN available—May 21, 2023 (13 pages).

Wikipedia, WireGuard, Jul. 16, 2023 (8 pages).

Wireguard Fast, Modern, Secure VPN Tunnel available Jul. 30, 2023 (7 pages).

Wu, Master's Thesis, Analysis of the WireGuard protocol, Jun. 17, 2019 (88 pages).

* cited by examiner

LOAD BALANCING VPN TRAFFIC

CROSS-REFERENCE TO RELATED APPLICATION

This application claims the benefit under 35 U.S.C. § 119 (e) of U.S. Provisional Patent Application No. 63/516,664, filed Jul. 31, 2023, which is hereby incorporated by reference.

BACKGROUND

In network computing, secure network protocol suites allow communication between clients and servers in a secure manner over a public network, such as the internet. This is advantageous, as public networks are not secure, and are therefore a security risk. Public networks also form much of the backbone of worldwide communication, and so are commonly used.

BRIEF DESCRIPTION OF THE DRAWINGS

Some implementations of the present disclosure are described with respect to the following figures.

Figure 1:
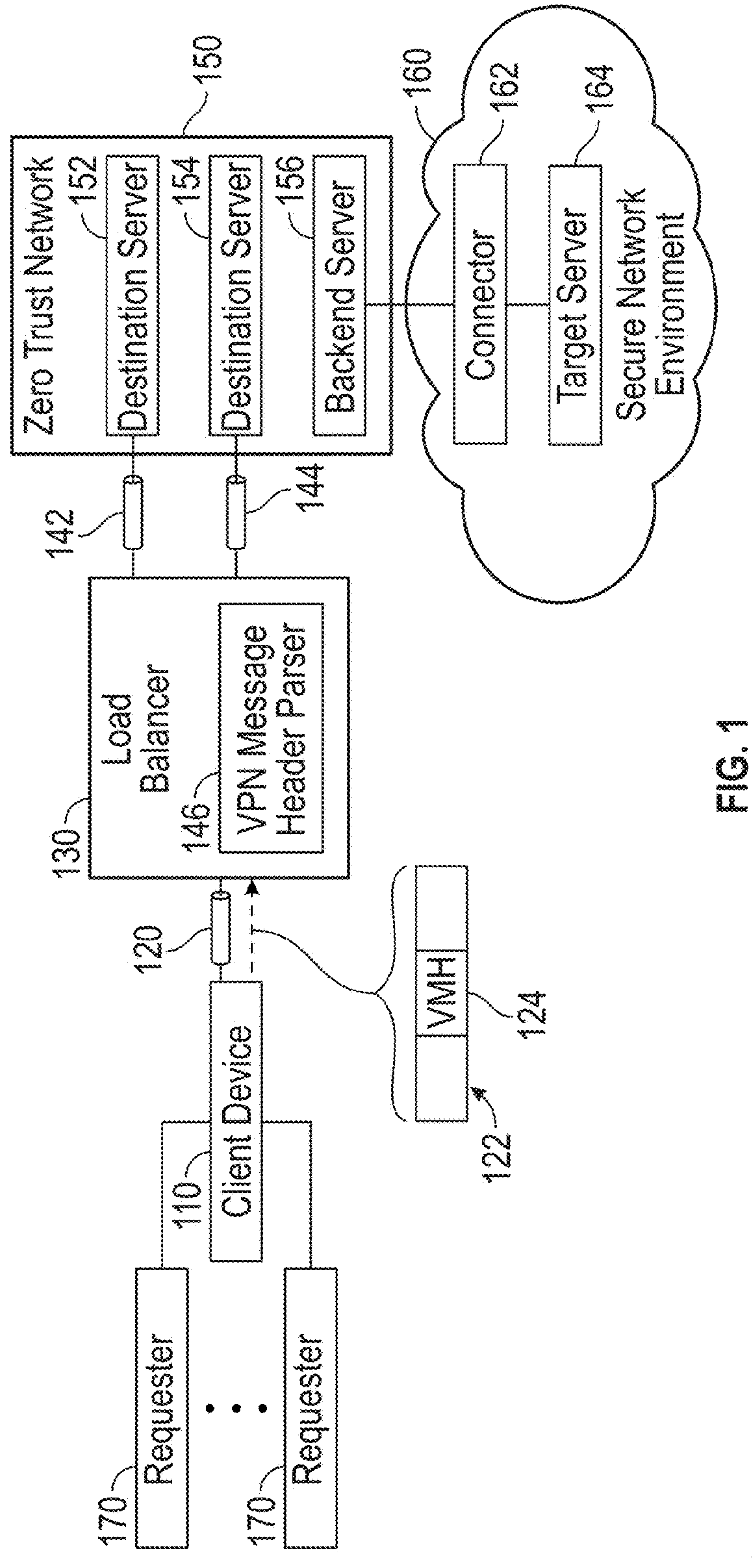
FIG. 1 is a block diagram of an arrangement that includes a client device, a load balancer, a zero trust network, and a secure network environment, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A zero trust network uses a security model that establishes trust through continual authentication and monitoring of each network access attempt by entities, such as users, devices, and programs. The entities are not trusted implicitly or by default (such as when the entities perform network access from a local network that is assumed to be more secure than an external network). Rather, with each network access, the entities have to be validated before network access can be granted to the entities.

The zero trust network includes destination servers, which are compute entities (physical servers or virtual servers) with which secure connections can be established by devices seeking to access target endpoints through the zero trust network. In some examples, virtual private networks (VPNs) can be established with the destination servers to carry encrypted data packets protected against unauthorized access. When VPNs are used, the destination servers can also be referred to as VPN backend servers. The use of VPNs can raise issues associated with load balancing VPN traffic across multiple destination servers of the zero trust network. Load balancing seeks to distribute load across the multiple destination servers to reduce the likelihood that any destination server of the zero trust network becomes overburdened with VPN traffic. Encrypted data packets are transmitted in VPNs. If the encrypted data packets have to be decrypted to apply load balancing, then that can increase a workload at a load balancer, since decryption operations consume substantial processing resources.

In some cases, a transport protocol such as a User Datagram Protocol (UDP) may be used for communicating data packets in VPNs. UDP is a connectionless protocol that allows for transport of data packets without establishing connections between endpoints over a network. However, use of UDP may make it challenging to preserve affinity of data packets of a given client device with a particular destination server when performing load balancing across connections to multiple destination servers. Preserving affinity refers to favoring communications of data packets of the given client device with the particular destination server as compared to other destination servers. Affinity can improve efficiency since the particular destination server may maintain state information for communications of the given client device, while other destination servers may not have the state information.

In accordance with some implementations of the present disclosure, a load balancer is used to provide load balancing of VPN traffic across multiple destination servers of a trust network, where the load balancing seeks to distribute VPN traffic across the multiple destination servers while also considering destination server selections made by a client device. In some examples of the present disclosure, a destination server selection by the client device is indicated using a field in a VPN message header of an encrypted data packet. The field in the VPN message header is accessible by the load balancer without having to decrypt the encrypted data packet. Different values of the field represent respective unique identifiers of the multiple destination servers of the trust network. The field of the VPN message header contains load balancing metadata that influences how the load balancer forwards encrypted data packets.

If an identifier of a destination server is not included in a VPN message header of a first data packet, then the load balancer can apply a load balancing algorithm to distribute the first data packet to a destination server selected by the load balancing algorithm. The load balancing can be applied by the load balancer without decrypting encrypted data packets in VPNs. For example, the load balancing algorithm can include one or more of: a round-robin algorithm that selects destination servers in a round-robin fashion; a random selection algorithm that selects a destination server from among multiple destination servers randomly; a weighted selection algorithm that assigns weights to the destination servers and selects the destination servers based on the weights; a selection algorithm that considers metrics of the destination servers, such as metrics relating to processing resource usage or performance, memory usage or performance, communication resource usage or performance, and so forth. The load balancer is able to adapt to changing conditions, such as conditions of destination servers of the trust network based on the metrics, by distributing VPN traffic based on the conditions of the destination servers.

On the other hand, if a value representing an identifier of a destination server ("identified destination server") is included in a VPN message header of a second data packet, then the load balancer would forward the second data packet to the identified destination server, instead of applying the load balancing algorithm. Affinity to respective destination servers can be preserved by allowing client devices to include values representing identifiers of destination servers in the fields of VPN message headers, so that the load balancer will direct packets containing the identifiers of destination servers to the specific identified destination servers.

As used here, a "trust network" can refer to a network environment in which a compute entity performs authorization of access requests from client devices. An example of the trust network is a zero trust network. A "destination server" in the trust network refers to a resource of the trust network with which a secure connection can be established. In some examples, the destination server may also be able to perform authorization of access requests. Alternatively, the destination server may forward an access request to another entity in the trust network to perform the authorization. Examples of destination servers include any or some combination of the following: an access portal server, a virtual computing entity such as a container (e.g., a Kubernetes container) or a VM, a serverless function, or another type of resource.

An access request can include a control message that is transmitted by a requester to connect to a target endpoint. In other examples, an access request can include a data packet transmitted by the requester that is to reach the target endpoint. In some examples, a destination server may also be referred to as a frontend server or a VPN backend server.

A secure communication protocol suite, such as an Internet Protocol Security (IPSec) suite, can be used for secure communications. In some examples, IPSec can be used to secure communications in VPNs. A secure network tunnel can be established using IPSec as the tunneling protocol. The IPSec network tunnel protects communications of a VPN. When communicating data through an IPSec network tunnel, an encryption algorithm is applied to encrypt data of a data packet (such as an Internet Protocol (IP) packet). The encrypted data packet is wrapped within outer headers, including an authentication header (AH) or an encapsulating security payload (ESP) header.

In other examples, different secure communication protocols can be employed for VPNs. An example of a different secure communication protocol is the WireGuard protocol, which is an open-source protocol run on top of UDP. In further examples, other secure communication protocols (such as OpenVPN) may be employed for VPNs.

When VPNs are employed that implement any of the foregoing secure communication protocols (e.g., IPSec, WireGuard, OpenVPN, etc.), load balancing becomes challenging as it is computationally expensive to decrypt encrypted data packets for purposes of distributing the data packets across destination servers of a trust network as part of the load balancing. Also, decrypting encrypted data packets in VPNs raises security risks, as the decrypted data packets may become accessible by attackers at the load balancer. On the other hand, if the load balancer is unable to decrypt encrypted data packets routed through the load balancer, the load balancer may not be able to determine see where the data packets should be directed.

As noted above, a VPN message header can be used for indicating how a data packet is to be handled by the load balancer. The VPN message header of an encrypted data packet is not encrypted, i.e., the VPN message header is accessible by the load balancer without having to decrypt the encrypted data packet. As a result, end-to-end encryption and privacy can be maintained while still allowing load balancing by the load balancer. A field in the VPN message header can refer to any collection of bits that is settable to any of multiple values. A "VPN message header" can refer to a header of an encrypted data packet carried in a VPN, where the header includes information accessible without performing decryption. In examples where WireGuard is employed, the VPN message header can be a WireGuard header according to the WireGuard protocol.

A WireGuard header includes various fields, including a reserved field that is not defined by the current version of the WireGuard protocol for any specific purpose. In accordance with some examples of the present disclosure, the reserved field of the WireGuard header can be used to determine how a load balancer is to forward an encrypted data packet in a VPN. The reserved field includes a predetermined number of reserved bits. If the reserved field is set to a first value (e.g., "0" or a different value), then that indicates a requester that transmitted the encrypted data packet has not selected a destination server of the trust network. In this case, the load balancer applies a load balancing algorithm to select the destination server in the trusted network to which the encrypted data packet is sent. However, if the reserved field is set to another value that represents an identifier of a destination server, then the load balancer would direct the encrypted data packet to the identified destination server. Not having to decrypt an encrypted data packet in a VPN to determine where to forward the encrypted data packet by the load balancer is advantageous as it maintains the security of the VPN and reduces the computational load of the load balancer, while also allowing distribution of data packets for load balancing purposes, and preserving affinity of data packets of a given client device to a particular destination server by directing the data packets of the given client device consistently to the particular destination server.

FIG. 1 is a block diagram of an example arrangement including a client device 110 communicating through a load balancer 130 with destination servers 152 and 154 in a zero trust network 150. The load balancer 130 can be implemented using one or more computers. The client device 110 may be a router, a gateway, or another type of network device through which electronic devices can connect to other endpoints. More generally, the client device 110 includes a computing device. A computing device can be a personal computing device, a mobile phone, a smartphone, a tablet, a laptop, or another electronic device. Although reference is made to a zero trust network in some examples, it is noted that other types of trust networks can be employed in other examples. In some examples, the client device 110 initiates a communication with the zero trust network 150 to gain access to a target resource in a secure network environment 160 which is not directly accessible to the client device 110. As shown in FIG. 1, the client device 110 establishes a client-side secure network tunnel 120 with the load balancer 130.

In examples where there are a plurality of client devices, a plurality of client-side secure network tunnels can be established between the load balancer 130 and the plurality of client devices, such that each client device has a unique client-side secure network tunnel with the load balancer 130. Establishing separate client-side secure network tunnels between the load balancer 130 and the plurality of client devices is more secure than sharing a common client-side secure network tunnel by the plurality of client devices. For example, a shared common client-side secure network tunnel may mean that the plurality of client devices share a key used for encrypting traffic carried in the shared common client-side secure network tunnel, which is less secure. If one client device of the plurality of client devices that share the same key is compromised, then communications for each of the other client devices that share the key would be compromised.

In some examples, the client device 110 communicates over an unsecured network, such as the Internet. To protect communications of sensitive data over the unsecure network transferred to or from a target server 164 in the secure network environment 160, the client device 110 is configured to communicate with the target server 164 through the zero trust network 150. The target server 164 can be an application server, a web server, a cloud server, or any other type of target resource. Although just one target server 164 is depicted in FIG. 1, in other examples, the secure network environment 160 includes multiple target servers. Also, in further examples, the zero trust network 150 can provide protected access of target servers in multiple secure network environments.

In some examples, the zero trust network 150 provides various security services. For example, the zero trust network 150 (e.g., the destination servers 152, 154) can provide any or some combination of the following: a remote desktop protocol (RDP) service between the client device 110 and the target server 164, a secure shell (SSH) access to the target server 164, isolated SSH access to the target server 164, a secure web gateway (SWG) (that filters traffic, enforces policies and ensures regulatory compliance), or other services.

The client device 110 transmits a data packet (destined to the target server 164) to the load balancer 130 through the client-side secure network tunnel 120. Destinations of the data packets can include one or more target servers in the secure network environment 160. The sources (origins) of the data packets can include one or more requesters 170. A "requester" can refer to an entity, such as a physical electronic device or a virtual computing entity, that is able to access a target resource.

In some examples, the load balancer 130 initiates multiple server-side secure network tunnels 142, 144 with the zero trust network 150. Each server-side secure network tunnel is established between the load balancer 130 and a respective destination server of the zero trust network 150. For example, the server-side secure network tunnel 142 is established between the load balancer 130 and the destination server 152, and the server-side secure network tunnel 144 is established between the load balancer 130 and the destination server 154. Each server-side secure network tunnel 142 or 144 may be established using IPSec. Note that it is possible to establish multiple secure network tunnels between the load balancer 130 and any given destination server.

In an example, a destination server 152 or 154 of the zero trust network 150 can provide a security service (such as an RDP service, SSH service, a SWG service, or another service) between the client device 110 and the target server 164. The destination server 152 or 154 establishes the service by communicating with a backend server 156 of the zero trust network 150. A "backend server" can refer to a server in the zero trust network 150 that is responsible for communications with a network environment (e.g., the secure network environment 160) that includes target resources to be accessed by the requesters 170. The backend server 156 can communicate with a connector 162 in the secure network environment 160. In an example, the connector 162 forwards data packets between the zero trust network 150 and target resources (including the target server 164) of the secure network environment 160.

In some examples, the load balancer 130 is deployed in the zero trust network 150 or outside of the zero trust network 150. In further examples, a plurality of load balancers 130 can be deployed. In examples where the zero trust network 150 includes the load balancer 130 deployed therein, a secure network tunnel would not have to be established between the load balancer 130 and a destination server 152 or 154 in the zero trust network 150. In such examples, the connections between the load balancer 130 and destination servers in the zero trust network 150 are implicitly secured. In other examples, if the load balancer 130 is outside the zero trust network 150, a server-side secure network tunnel is established between the load balancer 130 and a resource of the zero trust network 150, such as a destination server.

In accordance with some examples of the present disclosure, the load balancer 130 includes a VPN message header (VMH) parser 146 to read VPN message headers of incoming encrypted data packets received by the load balancer 130 from one or more client devices. The VMH parser 146 can be implemented with one or more hardware processing circuits or machine-readable instructions of the load balancer 130. An encrypted data packet 122 transmitted in a VPN between a requester 170 and the target server 164 is received by the load balancer 130. The VMH parser 146 can read a VPN message header (VMH) 124 in the encrypted data packet 122, without having to decrypt the encrypted data packet 122. The VPN message header 124 is part of cleartext of the encrypted data packet 122.

The VMH parser 146 is able to read a reserved field in the VPN message header 124 for determining how to forward the encrypted data packet 122 to the zero trust network 150. As noted above, if the reserved field is set to a first value (e.g., "0" or a different value), then that indicates a requester (e.g., 170) that transmitted the encrypted data packet has not selected a destination server of the trust network. In this case, the load balancer 130 applies a load balancing algorithm to select the destination server in the trusted network to which the encrypted data packet is sent. However, if the reserved field is set to another value that represents an identifier of a destination server, then the load balancer 130 would direct the encrypted data packet to the identified destination server.

The destination server 152 or 154 that receives the encrypted data packet 122 forwarded by the load balancer 130 can send the encrypted data packet 122 through the backend server 156 and the connector 162 to the target server 164. The target server 164 responds by sending a response packet, which is received by the destination server 152 or 154. The destination server 152 or 154 sends the response packet to the load balancer 330. The response packet received by the load balancer 130 includes an identifier (e.g., an IP address and UDP port) of the destination server that sent the response packet. The IP address and the UDP port of the destination server may be included in a destination IP address field and destination UPD port field of the IP header and UDP header, respectively, of the response packet. The response packet is sent to the client device 110. If the client device 110 is a network device, then the client device 110 can forward the response packet to a requester 170. If the client device 110 is a computing device, the client device 110 may be the target of the response packet. In either case, the requester 170 or the client device 110 (whichever is the target of the response packet) can record the identifier of the destination server included in the response packet. A value representing this identifier of the destination server can be added to the reserved field of the VPN message header of a subsequent encrypted data packet sent by the requester 170 or the client device 110 to the load balancer 130, so that the load balancer 130 can use this value added to the reserved field of the subsequent encrypted data packet to identify the destination server to which the subsequent encrypted data packet is to be sent.

Figure 2:
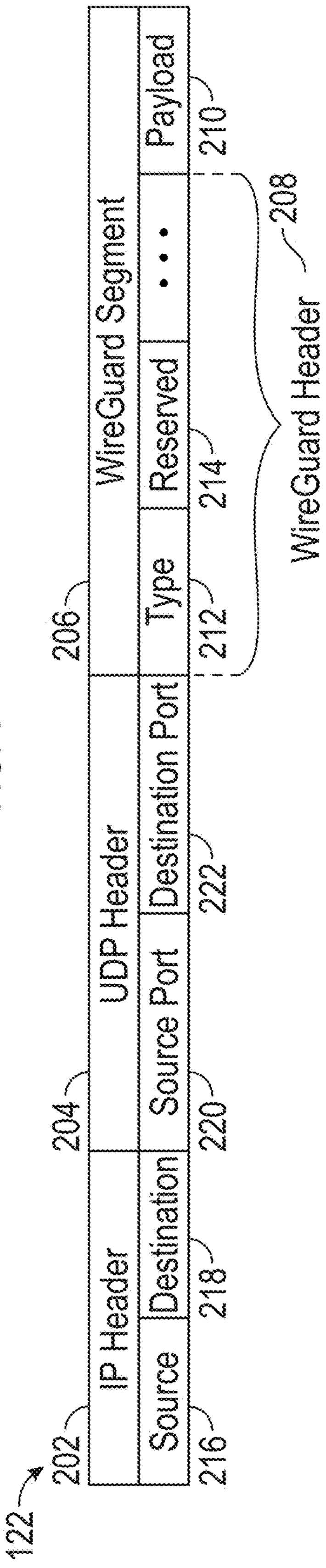
FIG. 2 is a block diagram of an encrypted data packet including a WireGuard segment according to some examples.

FIG. 2 is a block diagram of portions of the encrypted data packet 122 that can be communicated in a VPN. The encrypted data packet 122 carries encrypted data. In some examples, the encrypted data packet 122 includes an IP header 202, a UDP header 204, and a WireGuard segment 206 (or more generally, a segment for a secure communication protocol). The WireGuard segment 206 includes a WireGuard header 208 and a payload 210. The payload 210 carries encrypted data. Note that the IP header 202, the UDP header 204, and the WireGuard header 208 are not encrypted and thus the load balancer 130 is able to access information in the IP header 202, the UDP header 204, and the WireGuard header 208 without decrypting the encrypted data packet 122.

The WireGuard header 208 is an example of the VPN message header 124 of FIG. 1. The WireGuard header 208 includes a type field 212 (for indicating a message type), a reserved field 214, and other header fields (not shown).

The IP header 202 includes a source address field 216 including a source IP address of a source (e.g., the client device 110 or a requester 170) of the encrypted data packet 122, and a destination address field 218 including a destination IP address of a destination (e.g., the target server 164) of the encrypted data packet 122.

The UDP header 204 includes a source port field 220 including a source UDP port of the source, and a destination port field 222 including a destination UDP port of the destination In some examples, the reserved field 214 of the WireGuard header 208 is settable to any of various different values. For example, if the reserved field 214 is set to a first value (e.g., "0"), that indicates no destination server has been selected by a source of the encrypted data packet 122. As a result, the load balancer 130 assigns a destination server from a plurality of destination servers based on a load balancing algorithm.

The reserved field 214 of the WireGuard header 208 can also be set to other values that represent identifiers of respective different destination servers in the zero trust network 150. For example, if the reserved field 214 is set to a second value representing the identifier of the destination server 152, then the load balancer 130 would forward the encrypted data packet 122 to the destination server 152 (and would not apply the load balancing algorithm). Similarly, if the reserved field 214 is set to a third value representing the identifier of the destination server 154, then the load balancer 130 would forward the encrypted data packet 122 to the destination server 154 (and would not apply the load balancing algorithm)

In some examples, a value in the reserved field 214 can represent an IP address, a portion of an IP address, or any identifier of a destination server. For example, a function (e.g., an encoding function) can be applied to the IP address (or a portion of the IP address) of the destination server to derive the value representing the IP address (portion). In a more specific example, the last three digits (or some number of the least significant bits) of an IP address are encoded into a value added to the reserved field 214. The last three digits (or some number of the least significant bits) of an IP address are often enough to determine which destination server to route a data packet to.

Figure 3:
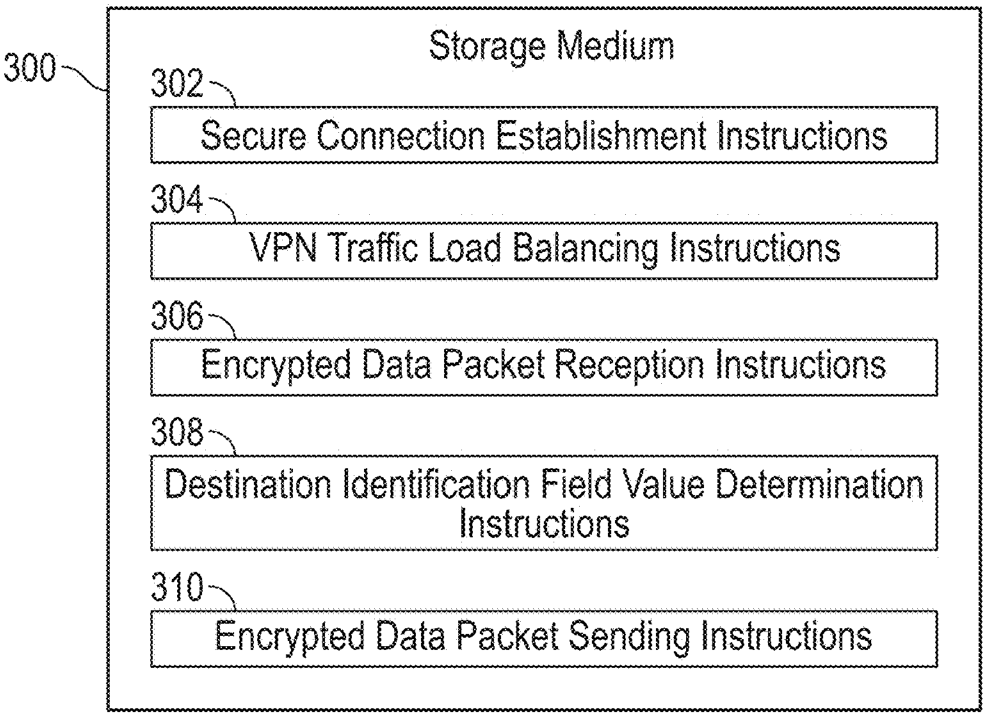
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a load balancer to perform various tasks.

The machine-readable instructions include secure connection establishment instructions 302 to establish respective secure connections between the load balancer and a plurality of destination servers in a trust network. The destination servers can include the destination servers 152 and 154 in the zero trust network 150 of FIG. 1. The server-side secure connections can include respective server-side secure network tunnels, such as 142 and 144 in FIG. 1. In other examples where the load balancer 130 is within a trust network (e.g., the zero trust network 150), server-side secure connections can be established over a network link within the trust network without establishing secure network tunnels.

The machine-readable instructions include VPN traffic load balancing instructions 304. The encrypted VPN traffic includes encrypted data packets containing payloads of encrypted data transmitted through one or more VPNs. The encrypted data packets are received from one or more client devices, such as the client device 110 of FIG. 1.

The machine-readable instructions include encrypted data packet reception instructions 306 to receive a given encrypted data packet from a client device. The given encrypted data packet includes a VPN message header, such as the WireGuard header 208 of FIG. 2. The VPN message header includes a destination identification field relating to identifying a destination server in the trust network. An example of the destination identification field is the reserved field 214 of the WireGuard header 208 of FIG. 2.

The machine-readable instructions include destination identification field value determination instructions 308 to determine whether a selected destination server in the trust network is identified based on a value of the destination identification field in the VPN message header. The selected destination server is one of the plurality of destination servers. The destination identification field can be set to one of various possible values. A first value in the destination identification field indicates that a destination server is not identified by the VPN message header. Other possible values in the destination identification field represent identifiers of respective destination servers.

The machine-readable instructions include encrypted data packet sending instructions 310 to, based on determining that the selected destination server is identified based on the value of the destination identification field in the VPN header, send the encrypted data packet to the selected destination server.

In some examples, the identifiers of the respective destination servers include respective portions (e.g., a subset of bits) of network addresses of the respective destination servers. The network addresses can include IP addresses, for example. A value representing a network address of a destination server can include a portion of the network address or can be based on applying a function to the entirety or a portion of the network address. For example, the function can be an encoding function that produces an encoded value based on encoding at least a portion of a network address of a destination server.

In some examples, the value of the destination identification field in the VPN message header is set by a source of the encrypted data packet. The source can be a client device (e.g., 130 in FIG. 1) or a requester (e.g., 170).

In some examples, the value of the destination identification field is a predetermined value indicating that no destination server is selected. The load balancer receives a further encrypted data packet from the client device, the further encrypted data packet including a VPN message header having a destination identification field. The load balancer detects that the destination identification field in the VPN message header of the further encrypted data packet is set to the predetermined value indicating that no destination server in the trust network is selected. Based on detecting that the destination identification field in the VPN message header of the further encrypted data packet is set to the predetermined value, the load balancer applies a load balancing algorithm to select a further destination server of the plurality of destination servers, and the load balancer sends the further encrypted data packet to the further destination server.

In some examples, the load balancer sends, to the client device, a response packet received from the further destination server, the response packet including an identifier of the further destination server. The load balancer receives, from the client device, a subsequent encrypted data packet including a VPN message header having a destination identification field set to a value representing an identifier of the further destination server.

In some examples, the encrypted data packet includes an IP header and a UDP header.

In some examples, the field of the encrypted data packet is accessible by the load balancer without decryption of the encrypted data packet.

In some examples, the secure connections between the load balancer and the destination servers include server-side secure network tunnels between the load balancer and the destination servers.

Figure 4:
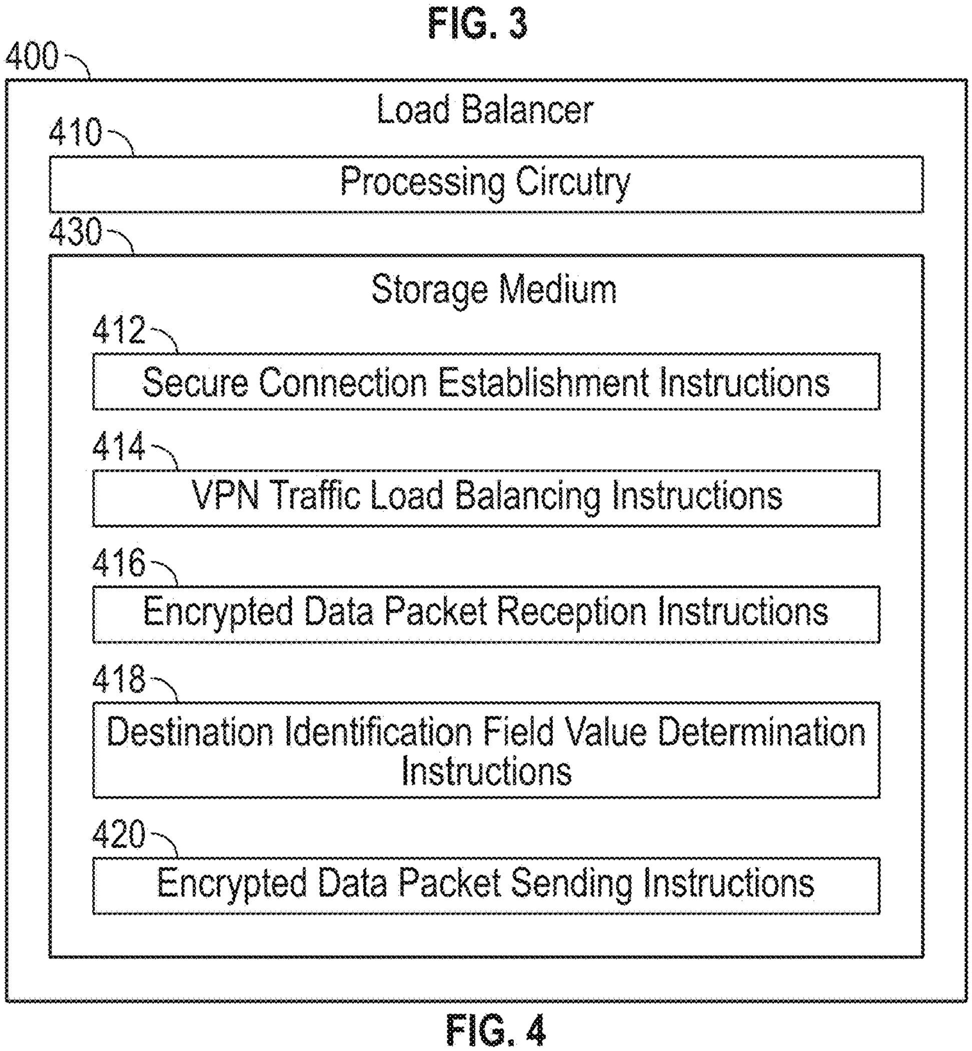
FIG. 4 is block diagram of a load balancer according to some examples.

FIG. 4 is a block diagram of a load balancer 400 according to some examples. An example of the load balancer 400 is the load balancer 130 of FIG. 1. The load balancer 400 includes a processing circuitry 410 coupled to a storage medium 430.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information. The one or more hardware logic components and circuits can be referred to as one or more hardware processors.

The storage medium 430 can include memory or storage. The memory may be volatile (e.g., random access memory, etc.), non-volatile (e.g., read only memory, flash memory, etc.), or a combination thereof. The memory may include an on-chip memory, an off-chip memory, a combination thereof, and the like. The memory may include a scratch-pad memory for the processing circuitry 410. The storage medium 430 can alternatively or additionally include a magnetic storage, an optical storage, a solid-state storage, a combination thereof, and the like, such as a flash memory, as a hard-disk drive, or other memory technology, or any other medium which can be used to store information.

In some examples, machine-readable instructions for performing various tasks discussed herein may be stored in the storage medium 430. The machine-readable instructions can include any or some combination of the following: software, firmware, middleware, microcode, hardware description language, or otherwise. Machine-readable instructions may include code (e.g., in source code format, binary code format, executable code format, or any other suitable format of code). The machine-readable instructions, when executed by the processing circuitry 410, cause the processing circuitry 410 to perform the various processes described herein.

The machine-readable instructions include secure connection establishment instructions 412 to establish respective secure connections between the load balancer and a plurality of destination servers in a trust network. The machine-readable instructions include VPN traffic load balancing instructions 414 to perform load balancing of encrypted VPN traffic across the plurality of destination servers in the trust network.

The machine-readable instructions include encrypted data packet reception instructions 416 to receive an encrypted data packet from a client device. The encrypted data packet includes a VPN message header having a destination identification field set to a value from a plurality of different values. The plurality of different values include a first value indicating that no destination server selection is made, and plural destination server values representing respective different destination servers of the plurality of destination servers.

The machine-readable instructions include destination identification field value determination instructions 418 to determine whether the value of the destination identification field is a destination server value representing a selected destination server of the plurality of destination servers.

The machine-readable instructions include encrypted data packet sending instructions 420 to, based on determining that the value of the destination identification field is the destination server value representing the selected destination server, send, from the load balancer, the encrypted data packet to the selected destination server.

In some examples, the encrypted data packet includes a payload containing encrypted data, and the VPN message header in the encrypted data packet is unencrypted.

In some examples, the destination server value in the destination identification field is based on a subset of bits of a network address of the selected destination server.

Figure 5:
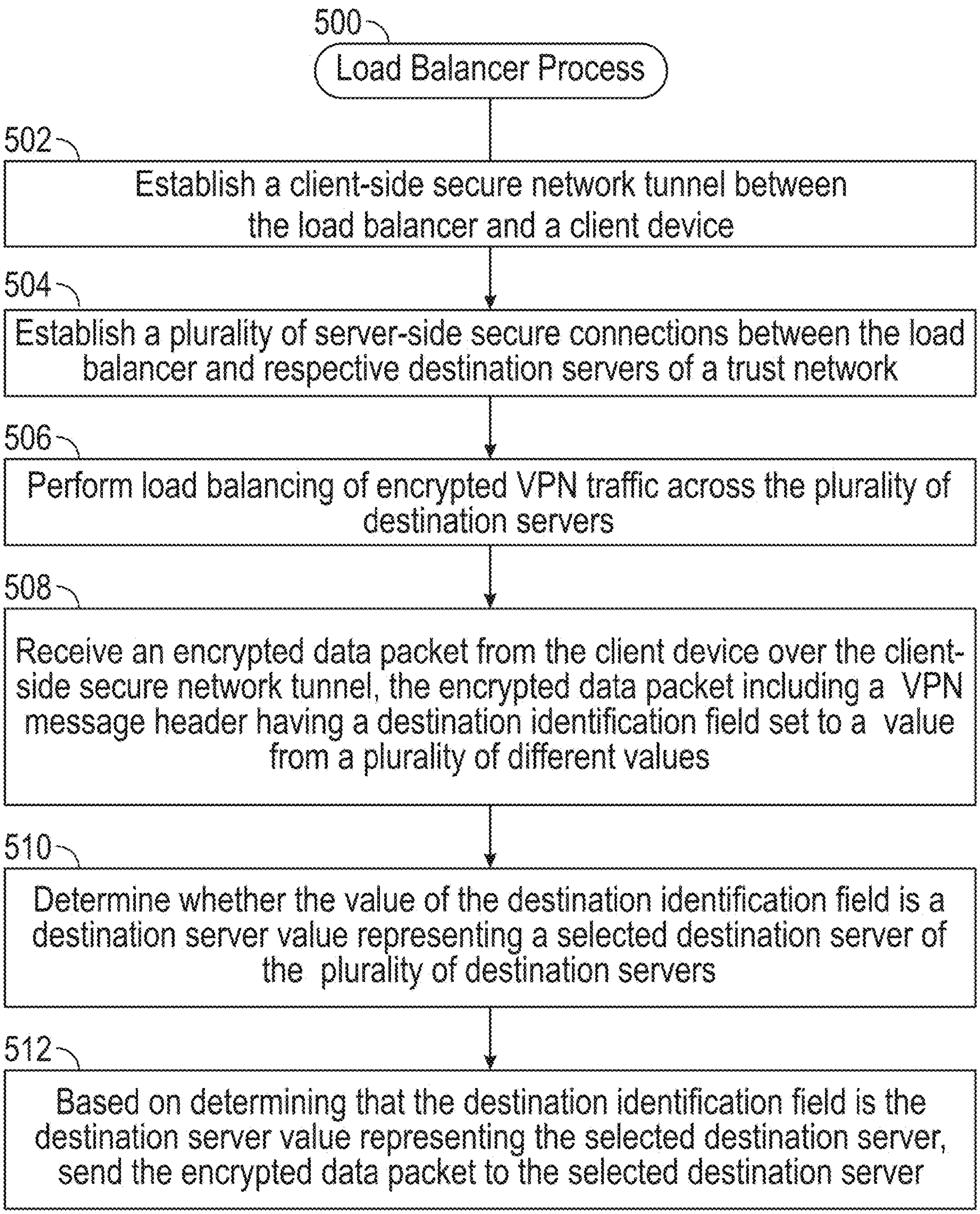
FIG. 5 is a flow diagram of a load balancer process according to some examples.

FIG. 5 is a flow diagram of a process 500 of a load balancer (e.g., the load balancer 130 of FIG. 1) according to some examples of the present disclosure. At 502, the load balancer establishes a client-side secure network tunnel between the load balancer and a client device. An example of the client-side secure network tunnel is depicted as 120 in FIG. 1.

At 504, the load balancer establishes a plurality of server-side secure connections between the load balancer and respective destination servers of a trust network.

At 506, the load balancer performs load balancing of encrypted VPN traffic across the plurality of destination servers. The load balancing is according to a load balancing algorithm.

At 508, the load balancer receives an encrypted data packet from the client device over the client-side secure network tunnel. The encrypted data packet includes a VPN message header having a destination identification field set to a value from a plurality of different values. The plurality of different values include a first value indicating that no destination server selection is made, and plural destination server values representing respective different destination servers of the plurality of destination servers.

At 510, the load balancer determines whether the value of the destination identification field is a destination server value representing a selected destination server of the plurality of destination servers.

At 512, based on determining that the value of the destination identification field is the destination server value representing the selected destination server, the load balancer sends the encrypted data packet to the selected destination server.

In some examples, the load balancer can establish a server-side secure network tunnel to an XFRM interface. In an example, the XFRM interface can communicate with a TUNnel (TUN) device of a destination server. XFRM refers to a framework for implementing IPSec packet path functionality. A TUN device provides a virtual interface that implements a software-based abstraction of a network by emulating the behavior of physical network cards, such as Ethernet or Wi-Fi cards.

In further examples, the ability to establish multiple server-side secure connections (e.g., server-side secure network tunnels) between the load balancer and the trust network allows the client-side secure network tunnel (e.g., 120 in FIG. 1) to be maintained between the client device and the load balancer, while some traffic of client connections in the client-side secure network tunnel is transferred from one server-side secure connection to another server-side secure connection, such as when a frontend server in the trust network becomes unavailable. This ability to transfer allows an additional destination server to be provisioned in the trust network to replace a destination server that has become unavailable. A destination server may become unavailable due to a fault of the destination server, a fault of a communication link to the destination server, the destination server being updated (for repair or maintenance such as to update an operating system (OS), firmware, or software), or the destination server becoming overburdened with workload. Also, increased workload can be handled by adding more destination servers, such as physical servers or virtual servers.

In some examples, when a given destination server is marked for maintenance, the load balancer can halt the assignment of new secure network tunnels to the given destination server. However, existing secure network tunnels to the given destination server remain uninterrupted. The data packets of the existing secure network tunnels are allowed to be "drained" from the given destination server, which refers allowing the communications of data packets through the existing secure network tunnels to complete. However, new traffic is not forwarded to the given destination server which is to be taken down for maintenance.

If the client device were connected with a secure network tunnel directly to a destination server, and the destination server becomes unavailable, then the secure network tunnel would have to be terminated, and a new secure network tunnel is established between the client device and the destination server. This is disruptive to communications of the client device. By adding the load balancer between the client device and the trust network, the client-side secure network tunnel may be maintained active between the client device and the load balancer, while traffic of client connections in the client-side secure network tunnel are transferred to another server-side secure network tunnel(s), whether existing or newly established. For example, rather than terminate a secure network tunnel between the client device and the destination server, another destination server may be provisioned for use in communicating traffic of the client device. A "client connection" can refer to a connection established by a client device with a target endpoint.

All examples and conditional language recited herein are to aid the reader in understanding the principles of the disclosed examples, and are to be construed as being without limitation to such specifically recited examples and conditions. Moreover, all statements herein reciting principles, aspects, and examples are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a load balancer to:

establish respective secure connections between the load balancer and a plurality of destination servers in a trust network;

perform load balancing of encrypted virtual private network (VPN) traffic across the plurality of destination servers;

receive first and second encrypted data packets from a client device, each of the first and second encrypted data packets comprising a VPN message header comprising a destination identification field relating to identifying a destination server in the trust network;

determine whether a selected destination server in the trust network is identified based on a value of the destination identification field in the VPN message header of the first encrypted data packet, the selected destination server being one of the plurality of destination servers;

based on determining that the selected destination server is identified based on the value of the destination identification field in the VPN message header of the first encrypted data packet, send, from the load balancer, the first encrypted data packet to the selected destination server;

detect that the destination identification field in the VPN message header of the second encrypted data packet is set to a predetermined value indicating that a destination server in the trust network is not selected;

based on detecting that the destination identification field in the VPN message header of the second encrypted data packet is set to the predetermined value, apply, by the load balancer, a load balancing algorithm to select a further destination server of the plurality of destination servers; and send, from the load balancer, the second encrypted data packet to the further destination server.

2. The non-transitory machine-readable storage medium of claim 1, wherein different values of the destination identification fields in VPN message headers of encrypted data packets represent respective identifiers of the plurality of destination servers in the trust network.

3. The non-transitory machine-readable storage medium of claim 2, wherein the respective identifiers of the plurality of destination servers comprise respective portions of network addresses of the plurality of destination servers.

4. The non-transitory machine-readable storage medium of claim 3, wherein the network addresses comprise Internet Protocol (IP) addresses, and wherein the identifier of a given destination server of the plurality of destination servers comprises a subset of bits of the IP address of the given destination server.

5. The non-transitory machine-readable storage medium of claim 1, wherein the value of the destination identification field in the VPN message header of the first encrypted data packet comprises an encoded value based on encoding at least a portion of a network address of the selected destination server.

6. The non-transitory machine-readable storage medium of claim 1, wherein the value of the destination identification field in the VPN message header of the first encrypted data packet is set by a source of the first encrypted data packet.

7. The non-transitory machine-readable storage medium of claim 1, wherein the instructions upon execution cause the load balancer to:

send, from the load balancer to the client device, a response packet received from the further destination server, the response packet comprising an identifier of the further destination server; and receive, at the load balancer from the client device, a subsequent encrypted data packet comprising a VPN message header including a destination identification field set to a value representing an identifier of the further destination server.

8. The non-transitory machine-readable storage medium of claim 1, wherein the first encrypted data packet comprises a User Datagram Protocol (UDP) header.

9. The non-transitory machine-readable storage medium of claim 1, wherein the destination identification field of the first encrypted data packet is accessible by the load balancer without decryption of the first encrypted data packet.

10. The non-transitory machine-readable storage medium of claim 1, wherein the secure connections comprise secure network tunnels between the load balancer and the plurality of destination servers.

11. The non-transitory machine-readable storage medium of claim 1, wherein the VPN message header of the first encrypted data packet comprises a WireGuard header, and the destination identification field of the first encrypted data packet is included in the WireGuard header.

12. The non-transitory machine-readable storage medium of claim 1, wherein the first encrypted data packet comprises a payload containing encrypted data, and wherein the first encrypted data packet comprises an Internet Protocol (IP) header, a User Datagram Protocol (UDP) header, and the VPN message header of the first encrypted data packet.

13. The non-transitory machine-readable storage medium of claim 1, wherein the load balancing is not applied for the first encrypted data packet in response to the destination identification field in the VPN message header of the first encrypted data packet identifying the selected destination server.

14. A load balancer comprising:

a processor; and a non-transitory storage medium storing instructions executable on the processor to:

establish respective secure connections between the load balancer and a plurality of destination servers in a trust network;

perform load balancing of encrypted virtual private network (VPN) traffic across the plurality of destination servers;

receive an encrypted data packet from a client device, the encrypted data packet comprising a VPN message header comprising a destination identification field set to a value from a plurality of different values, the plurality of different values comprising a first value indicating that no destination server selection is made, and plural destination server values representing respective different destination servers of the plurality of destination servers;

determine whether the value of the destination identification field is a destination server value representing a selected destination server of the plurality of destination servers;

based on determining that the value of the destination identification field is the destination server value representing the selected destination server, send, from the load balancer, the encrypted data packet to the selected destination server;

receive a further encrypted data packet from the client device, the further encrypted data packet comprising a VPN message header including a destination identification field;

detect that the destination identification field in the VPN message header of the further encrypted data packet is set to the first value no destination server selection is made;

based on detecting that the destination identification field in the VPN message header of the further encrypted data packet is set to the first value, apply, by the load balancer, a load balancing algorithm to select a further destination server of the plurality of destination servers; and send, from the load balancer, the further encrypted data packet to the further destination server.

15. The load balancer of claim 14, wherein the instructions are executable on the processor to:

send, from the load balancer to the client device, a response packet received from the further destination server, the response packet comprising an identifier of the further destination server; and receive, at the load balancer from the client device, a subsequent encrypted data packet comprising a VPN message header including a destination identification field set to a destination server value representing an identifier of the further destination server.

16. The load balancer of claim 14, wherein the destination server value is based on a subset of bits of a network address of the selected destination server.

17. The load balancer of claim 14, wherein the encrypted data packet comprises a payload containing encrypted data, and the VPN message header in the encrypted data packet is unencrypted.

18. A method comprising:

establishing, by a load balancer, a client-side secure network tunnel between the load balancer and a client device;

establishing, by the load balancer, a plurality of server-side secure connections between the load balancer and a plurality of destination servers of a trust network;

performing, by the load balancer, load balancing of encrypted virtual private network (VPN) traffic across the plurality of destination servers;

receiving, by the load balancer, first and second encrypted data packets from the client device over the client-side secure network tunnel, each of the first and second encrypted data packets comprising a VPN message header comprising a destination identification field set to a value from a plurality of different values;

determining, by the load balancer, whether the value of the destination identification field of the first encrypted data packet is a destination server value representing a selected destination server of the plurality of destination servers;

based on determining that the value of the destination identification field of the first encrypted data packet is the destination server value representing the selected destination server, sending, from the load balancer, the first encrypted data packet to the selected destination server;

detecting, by the load balancer, that the value of the destination identification field of the second encrypted data packet is set to a predetermined value indicating that a destination server in the trust network is not selected;

based on detecting that the destination identification field of the second encrypted data packet is set to the predetermined value, applying, by the load balancer, a load balancing algorithm to select a further destination server of the plurality of destination servers; and sending, from the load balancer, the second encrypted data packet to the further destination server.

19. The method of claim 18, wherein the client device comprises a network device through which electronic devices connect to target endpoints through the trust network.

* * * * *